United States Patent
David et al.

(10) Patent No.: US 11,878,606 B2
(45) Date of Patent: Jan. 23, 2024

(54) BATTERY THERMAL MANAGEMENT SYSTEM FOR VEHICLE

(71) Applicant: Ningbo Geely Automobile Research & Development Co., Ltd., Ningbo (CN)

(72) Inventors: Sandeep David, Gothenburg (SE); Bengt Axelsson, Västra Frölunda (SE); Sri Vishnu Gorantla Narayana Murthy, Gothenburg (SE)

(73) Assignee: NINGBO GEELY AUTOMOBILE RESEARCH & DEV. CO. LTD., Ningbo (CN)

( * ) Notice: Subject to any disclaimer, the term of this patent is extended or adjusted under 35 U.S.C. 154(b) by 218 days.

(21) Appl. No.: 17/327,329

(22) Filed: May 21, 2021

(65) Prior Publication Data

US 2021/0276455 A1    Sep. 9, 2021

Related U.S. Application Data

(63) Continuation of application No. PCT/CN2019/119062, filed on Nov. 18, 2019.

(30) Foreign Application Priority Data

Dec. 10, 2018    (EP) .................................. 18211365

(51) Int. Cl.
   *B60K 1/04*      (2019.01)
   *B60L 58/27*     (2019.01)
   *H01M 10/615*    (2014.01)
   *H01M 10/625*    (2014.01)
   *H01M 10/6568*   (2014.01)
   (Continued)

(52) U.S. Cl.
   CPC ................ *B60L 58/27* (2019.02); *B60K 1/04* (2013.01); *F01P 3/18* (2013.01); *F01P 3/20* (2013.01);
   (Continued)

(58) Field of Classification Search
   CPC ..... B60K 1/04; B60K 2001/0438; F01P 3/18; F01P 3/20; F01P 5/10; H01M 10/615; H01M 10/625; H01M 10/6558
   See application file for complete search history.

(56) References Cited

U.S. PATENT DOCUMENTS

| | | | |
|---|---|---|---|
| 6,464,027 B1 * | 10/2002 | Dage ......................... | F01P 3/20 123/41.14 |
| 10,641,431 B2 * | 5/2020 | Mallick ..................... | F17C 1/06 |

(Continued)

FOREIGN PATENT DOCUMENTS

| CN | 102200073 A | 9/2011 |
|---|---|---|
| CN | 102472132 A | 5/2012 |

(Continued)

OTHER PUBLICATIONS

International Search Report from corresponding International Application No. PCT/CN2019/119062, dated Feb. 21, 2020, 2 pages.

*Primary Examiner* — Jason D Shanske
*Assistant Examiner* — James J Triggs
(74) *Attorney, Agent, or Firm* — Tucker Ellis LLP

(57) ABSTRACT

A battery thermal management system for a vehicle having a drivetrain. The thermal management system includes: a high-voltage propulsion battery, a waste-heat source of the vehicle drivetrain, and a battery heating circuit configured for circulating a battery coolant. The battery heating circuit includes a pipe being routed in the vicinity of, and spaced-apart from, the waste-heat source and configured for conveying the battery coolant for enabling the battery coolant within the pipe to heat-up by heat-radiation emitted from the waste-heat source and/or heat-convection through air from the waste-heat source to the battery coolant, and the battery heating circuit is configured for conveying the heated battery coolant to the battery for enabling heating of the battery by the battery coolant.

14 Claims, 10 Drawing Sheets

(51) Int. Cl.
*H01M 10/66* (2014.01)
*F01P 3/18* (2006.01)
*F01P 3/20* (2006.01)
*F01P 5/10* (2006.01)
*F01P 7/14* (2006.01)
*B60K 1/00* (2006.01)

(52) U.S. Cl.
CPC .................. *F01P 5/10* (2013.01); *F01P 7/14* (2013.01); *H01M 10/615* (2015.04); *H01M 10/625* (2015.04); *H01M 10/6568* (2015.04); *H01M 10/66* (2015.04); *B60K 2001/008* (2013.01); *B60K 2001/0438* (2013.01); *F01P 2007/146* (2013.01); *F01P 2060/12* (2013.01); *F01P 2060/16* (2013.01); *H01M 2220/20* (2013.01)

(56) References Cited

U.S. PATENT DOCUMENTS

| | | | |
|---|---|---|---|
| 11,679,691 B2 * | 6/2023 | Yang | H01M 10/63 429/62 |
| 2003/0070849 A1 * | 4/2003 | Whittaker | F02B 63/00 180/68.2 |
| 2009/0078400 A1 * | 3/2009 | Tamura | B60H 1/00499 165/287 |
| 2009/0280395 A1 * | 11/2009 | Nemesh | H01M 10/615 429/62 |
| 2010/0175938 A1 * | 7/2010 | Fassnacht | B60W 30/192 180/65.265 |
| 2013/0111932 A1 * | 5/2013 | Mishima | B60L 58/27 62/159 |
| 2016/0107503 A1 * | 4/2016 | Johnston | B60H 1/00278 165/202 |
| 2017/0365762 A1 * | 12/2017 | Herrmann | F25B 17/00 |
| 2021/0210811 A1 * | 7/2021 | Uto | H01M 10/613 |

FOREIGN PATENT DOCUMENTS

| | | |
|---|---|---|
| CN | 104520137 A | 4/2015 |
| CN | 105083043 A | 11/2015 |
| CN | 107735279 A | 2/2018 |
| DE | 102016222080 A | 5/2018 |
| JP | 2002352866 A | 12/2002 |
| JP | 2011025812 | 2/2011 |

* cited by examiner

BATTERY THERMAL MANAGEMENT SYSTEM FOR VEHICLE

RELATED APPLICATION DATA

This application is a continuation of International Patent Application No. PCT/CN2019/119062, filed Nov. 18, 2019, which claims the benefit of European Patent Application No. 18211365.4, filed Dec. 10, 2018, the disclosures of which are incorporated herein by reference in their entireties.

TECHNICAL FIELD

The disclosure relates to a battery thermal management system for a vehicle. The disclosure also relates to a vehicle comprising such a battery thermal management system, as well as a method for heating a high-voltage propulsion battery of a vehicle. The method and system according to the disclosure can for example be implemented in a car.

However, although the disclosure will be described in relation to a car, the disclosure is not restricted to this particular type of vehicle, but may alternatively be installed in other type of vehicles such as off-road vehicles, trucks, buses, marine vessels, working machines such as excavators, wheel loaders and the like, snowmobiles, motorcycles, etc.

BACKGROUND

Hybrid electric vehicles typically comprise two power sources for vehicle propulsion: a combustion engine, such as for example a petrol or diesel engine, and an electrical motor connected to a high-voltage electrical storage system such as a high-voltage (HV) battery. A hybrid electric vehicle may typically drive using any of these two power sources, or in combination. Charging of the HV battery may for example be performed by the combustion engine or by connection to an external power grid.

Battery electric vehicles typically comprise one or more electrical motors connected to a high-voltage electrical storage system such as a HV battery. Charging of the HV battery may for example be performed by connection to an external power grid.

Moreover, fuel cell powered vehicles typically comprises one or more electrical motors connected to a high-voltage electrical storage system such as a HV battery, and a fuel cell configured for converting chemical energy from a fuel into electrical energy for charging the HV battery and powering the electrical motors.

The HV battery may also be used for storing regenerated energy, i.e. storing electrical energy that stems from converting kinematic energy of the vehicle to electrical energy, for example during deceleration of the vehicle.

However, the performance of conventional HV batteries for hybrid electric vehicles, such as for Li-Ion batteries, are highly temperature dependent. Hence, the HV battery typically needs occasional cooling for overcome the heat losses generated by the battery and to keep the battery within its allowed temperature limits so as to obtain the best performance and good lifetime.

Moreover HV batteries typically also need occasional heating, especially during cold start of the vehicle at low ambient temperature. For example, HV batteries may require heating to a temperature of about 15 deg C. to obtain full battery performance.

One known solution for heating the battery during for example cold start in cold ambient conditions is to heat the battery using a dedicated electrically powered battery heater, that for example may heat a battery coolant of a liquid cooled/heated battery, or heat air to be blown into the battery of an air cooled/heated battery. This type of heating however generally results in a relatively large energy losses because the electrical heater need relatively high power for enabling quick heating.

An alternative known solution is to cycle power in and out of the battery, and thereby heat the battery using the so-called Joule heating effect. However, this process tends to be relatively slow since the battery power obtainable at low temperatures, such as for example below −10 degrees Celsius (deg C.) is rather low.

Consequently, despite the activities in the field, there is still a demand for a further improved battery thermal management system that contributes to heating of the battery while keeping the energy losses low.

SUMMARY

This section provides a general summary of the disclosure, and is not a comprehensive disclosure of its full scope or all of its features.

An object of the present disclosure is consequently to provide a battery thermal management system that contributes to heating of the battery while keeping the energy losses low.

This and other objects are at least partly achieved by a battery thermal management system and method as defined in the accompanying independent claims.

In particular, according to a first aspect of the present disclosure, the objective is at least partly achieved by a battery thermal management system for a vehicle having a drivetrain, wherein the thermal management system comprises a high-voltage propulsion battery, a waste-heat source of the vehicle drivetrain and a battery heating circuit configured for circulating a battery coolant, wherein the battery heating circuit includes a pipe being routed in the vicinity of, and spaced-apart from, the waste-heat source and configured for conveying the battery coolant for enabling the battery coolant within the pipe to heat-up by heat-radiation emitted from the waste-heat source and/or heat-convection through air from the waste-heat source to the battery coolant, and wherein the battery heating circuit is configured for conveying the heated battery coolant to the battery for enabling heating of the battery by the battery coolant.

Moreover, according to a second aspect of the present disclosure, the objective is also at least partly achieved by a method for heating a high-voltage propulsion battery of a vehicle comprising a drive train with a waste-heat source. The method comprising: providing a battery heating circuit including a pipe that is routed in the vicinity of, and spaced-apart from, the waste-heat source of the drivetrain; conveying a battery coolant through the pipe for heating up the battery coolant within the pipe by heat-radiation emitted from the waste-heat source and/or heat-convection through air from the waste-heat source to the battery coolant; and conveying the heated battery coolant by the battery heating circuit to the battery for enabling heating of the battery by the battery coolant.

The underlying concept of the solution of the present disclosure is to absorb thermal losses from the waste-heat source to the surrounding via primarily heat-radiation, but also heat-convection via the air surrounding the waste-heat source, and to subsequently use the absorbed heat for heating up the battery.

The heat released from the waste-heat source e in the form of heat-radiation and heat-convention is otherwise unused because it simply heats up the surrounding air as well as the vehicle components and vehicle chassis in the vicinity of the waste-heat source. Consequently, by absorbing and recovering at least a part of the waste heat of the waste-heat source a more energy efficient overall powertrain of the vehicle is accomplished.

Moreover, if the waste-heat source is a combustion engine, the solution according to the disclosure does not involve direct heat transfer from either the body of the combustion engine or an engine coolant of a water-cooled combustion engine, thereby avoiding that the absorbed heat results in decreased operating temperature of the combustion engine, which generally results in a decrease in the combustion engine's operating efficiency. Instead, the solution merely involves using waste heat lost from the engine to the surrounding in a simple and safe manner for passively heating up the battery with captured heat loss from the combustion engine.

In addition, by avoiding direct heat transfer from either the body of the waste-heat source or a liquid coolant of a water cooled waste-heat source for heating the battery, the battery is safe from being subjected to potentially extremely high temperatures associated with liquid coolant of a waste-heat source, and also safely spaced apart from any moving parts of the waste-heat source that could potentially results in physical damages to battery.

Further advantages are achieved by implementing one or several of the features of the dependent claims.

In one example embodiment, the pipe is made of aluminium. Thereby, a lightweight and cost-efficient battery heating circuit may be provided.

In a further example embodiment, the pipe has a circular cross-section and a smooth rounded outer surface. This feature further enhances the low-cost design of the battery thermal management system.

In still a further example embodiment, the pipe has a rectangular or elliptical cross-section and/or fins extending radially outwardly on the outer surface for increasing the heat transfer from the waste-heat source to the battery coolant.

In yet a further example embodiment, the pipe is partly routed within in the range of 1-50 cm, specifically 3-25 cm, and more specifically 6-15 cm, of the waste-heat source. The distance may be selected taking into account desired heating power to be delivered by the battery thermal management system.

In one example embodiment, the waste-heat source is a combustion engine, or an exhaust manifold, or an exhaust system, or a catalyst converter, or a turbo charger, or an electrical propulsion motor, or a fuel cell.

In one example embodiment, the pipe is routed along at least three sides of the waste-heat source, as seen from above. This provides a relatively long routing of the pipe along the waste-heat source.

In one example embodiment, the pipe has an interior diameter of 5-50 mm, specifically 7-35 mm, and more specifically 10-20 mm. The diameter may be selected depending on the desired heating power to be delivered by the battery thermal management system. A larger diameter pipe generally has higher heating power capacity than a small diameter pipe.

In one example embodiment, the pipe is routed to have a length of 0.5-4 meters, specifically 0.75-3 meters, and more specifically 1-2 meters within the engine bay. Thereby, a sufficient pipe length is provided for accomplishing a significant heating of the HV battery during cold-start of the vehicle.

In one example embodiment, the waste-heat source is a liquid-cooled combustion engine having engine cooling circuit including a radiator and a circulation pump, wherein the battery thermal management system is free from a heat-exchanger connected to engine cooling circuit and battery heating circuit and configured for transferring heat from the engine coolant to battery coolant. Thereby, slowed down warming-up of the combustion engine is avoided.

In a further example embodiment, the battery thermal management system further comprises a battery cooling circuit configured for circulating the battery coolant, wherein the battery cooling circuit and battery heating circuit have a common coolant circulation pump. Thereby, less components are required, thereby saving space and cost and increasing reliability.

In one example embodiment, the battery thermal management system further comprises a multi-way selector valve for enabling the battery coolant to flow in either the battery cooling circuit or the battery heating circuit, or partly in battery cooling circuit and partly in the battery heating circuit. Thereby, the temperature of the battery coolant entering the HV battery can be regulated by appropriate routing of the battery coolant in each of said circuits, respectively.

In still a further one example embodiment, the battery cooling circuit comprises a passive cooler in form of a radiator and an active cooler in form of a heat-exchanger forming part of an active cooling circuit including a compressor and a condenser, wherein the multi-way selector valve is configured for enabling the battery coolant to selectively flow in the battery heating circuit, or through the passive cooler of the battery cooling circuit, or through the heat-exchanger of the active cooling circuit. Thereby, sufficient cooling of the battery coolant is always provided independent of ambient temperature.

In one example embodiment, the battery thermal management system further comprise an electronic control unit configured for controlling the operation of at least the circulating pump and the selector valve, wherein the electronic control unit configured for circulating the battery coolant in the battery heating circuit when an operating temperature of the battery is below a first threshold value, and wherein the electronic control unit configured for circulating the battery coolant in the battery cooling circuit when the operating temperature of the battery is above a second threshold value. Electronic control of the routing and flow of battery coolant enables an automatic and optimal heating and cooling of the battery.

The disclosure also relates to a vehicle comprising an engine bay, a passenger compartment, a luggage compartment, and a battery thermal management system as described above, wherein the waste-heat source is located in the engine bay in a front region of the vehicle and the battery is located beneath the passenger compartment floor or the luggage compartment floor.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which.

DETAILED DESCRIPTION

Figure 1:
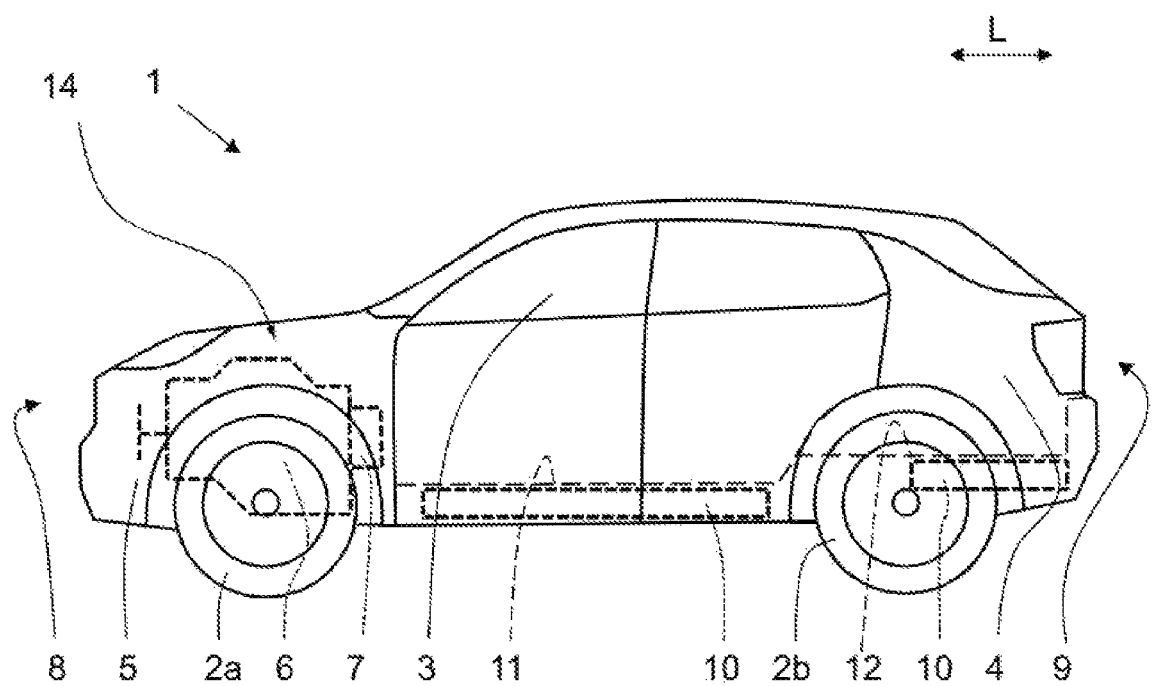
FIG. 1 shows a schematic side view of a vehicle including a battery thermal management system according to an example embodiment of the disclosure.
Figure 11:
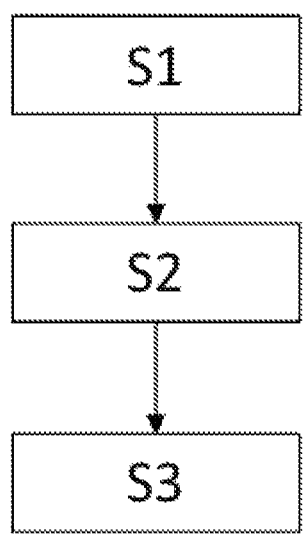
FIG. 11 shows the principle steps of a method for heating the high-voltage propulsion battery of the vehicle comprising the waste-heat source.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present disclosure.

Referring now to FIG. 1, there is depicted a hybrid electric vehicle in form of a car 1 having a front region 8 and a rear region 9 as seen in a longitudinal direction L of the vehicle 1, front wheels 2a, rear wheels 2b, a passenger compartment 3, a luggage compartment 4 and an engine bay 5 for housing at least a part of a powertrain including a waste-heat source 14 in form of a combustion engine 6 and an electrical propulsion motor 7.

In the specific example embodiments shown in the figures of this disclosure the combustion engine 6 and an electrical propulsion motor 7 are illustrated as being integrated into a single unit, but other layouts are equally possible, in particular having the combustion engine and electrical motor separated and spaced-apart from each other. For example the combustion engine may be located at the front of the vehicle, and for example arranged for powering the front wheels 2a and/or the rear wheel 2b, and the electrical motor may be located spaced-apart from the combustion engine within a transmission or at the rear axle of the vehicle and arranged for powering the front and/or rear wheels 2b.

The vehicle 1 may also comprise one or more high-voltage (HV) propulsion battery packs 10, herein also simply referred to as battery, located for example beneath a passenger compartment floor 11 and/or a luggage compartment floor 12. High voltage refers for example to a voltage level above 60 Volt, specifically above 200 Volt, and more specifically above 350 Volt.

A first example embodiment of a battery thermal management system for a vehicle 1 will hereinafter be described with reference to FIG. 2, which shows a schematic top-side view of a car having front wheels 2a, rear wheels 2b, a passenger compartment 3, a luggage compartment 4 and an engine bay 5 for housing the waste-heat source 14 in form of the combustion engine 6 and the electrical propulsion motor 7.

In this example embodiment, the combustion engine 6 and electrical motor 7 are assembled into a single unit, and drive shafts 24 driving connects the front wheel 2a with the combustion engine-electrical motor-unit.

The combustion engine 6 typically includes one or more reciprocating pistons 26 sliding in cylinders of an engine block 27 of the combustion engine 6. The engine block is often cast in iron or aluminum alloy.

The combustion engine 6, or at least the engine block 27, generally has a rectangular-shape with four sides, as seen from above, namely a right side 28, a front side 29, a left side 30 located opposite to the right side 28, and a rear side 31 located opposite to the front side 29.

Electrical conductors 25 electrically connect the HV battery 10 with the electrical motor 7 for transmitting electrical power from the HV battery to the electrical motor 7 during driving, and for transmitting electrical power from the electrical motor 7 to the HV battery 10 during for example regenerative braking. The electrical power transmitted between the HV battery 10 and the electrical motor 7 typically passes through an electrical power converter (not showed), such as for example a power inverter, that is configured for transforming the electrical power to a suitable type, depending on the type of electrical motor 7 used.

The HV battery 10 may for example be located in the passenger compartment 3 or the luggage compartment 4, and the combustion engine is typically located in the engine bay 5.

The thermal management system comprises the high-voltage (HV) propulsion battery 10, the combustion engine 6 and a battery heating circuit 20 configured for circulating a battery coolant, wherein the battery heating circuit 20 includes a pipe 21 being routed in the vicinity of, and spaced-apart from, the combustion engine 6 and configured for conveying the battery coolant for enabling the battery coolant within the pipe 21 to heat-up by heat-radiation 22 emitted from the combustion engine 6 and/or heat-convection 22 through air from the combustion engine 6 to the battery coolant, and wherein the battery heating circuit 20 is configured for conveying the heated battery coolant to the battery 10 for enabling heating of the battery 10 by the battery coolant.

The battery thermal management system thus includes a thermal path for the battery coolant that is routed in the vicinity of the combustion engine 6, such that battery coolant can become heated and thus capture heat loss from the combustion engine 6 to the air surrounding it.

The term circulating the battery coolant thus means to move the battery coolant in a circuit, or to have to battery coolant following a course or path that returns to a starting point, or simply having the battery coolant flowing around in never ending path.

The term "spaced-apart" means that the pipe 21 is free from direct contact with the waste-heat source 14. Consequently, the waste-heat source 14 need no specially adapted interface surface configured for interaction with the pipe 21, and no adaptations or specially manufactured versions of the waste-heat source 14 need to be provided prior to installation of the battery thermal management system according to the present disclosure. In addition, also the pipe 21 need no specially adapted interface surface configured for interaction with the waste-heat source 14, and a conventional, of the shelf, pipe 21 may be used.

The battery coolant is a liquid coolant, such as for example a glycol coolant or a non-electrically conductive liquid coolant.

Combustion engine temperature is typically around 90 deg C. after a relatively short time period after a cold start, and in an extremely cold environment, the battery coolant and the pipe 21 of the battery heating circuit can be as low as for example −30 deg C. Consequently, with such a large temperature difference, heat radiated and/or convected out from the combustion engine 6 can be efficiently transferred to the battery coolant flowing within the pipe 21.

For sake of clarity the three principle heat transfer mechanisms will be briefly identified and discussed. Heat transfer by heat-radiation refers to the mechanism in which heat is transmitted by emission of electromagnetic waves from a first object and absorbing the electromagnet waves by a second object, without any physical contact between the first and second objects. Heat transfer by heat-convection refers to the form of heat transfer in which energy transition occurs within a fluid, such as air or water. In other words, a first object heats up a fluid, such as air, and the heated air subsequently moves to a second object and transfers heat from the heated air to the second object. Finally, heat-conduction is a process in which heat transfer takes place between objects by direct contact, e.g. heat may be transferred from a first hot object to a second less hot object when the first and second objects are in direct contact with each other. The present disclosure only concerns heat-radiation and heat-convection as heat transfer mechanism from the combustion engine to the pipe 21 of the battery heating circuit 20.

The pipe 21 may for example be routed at a distance 23 in the range of 1-50 cm, specifically 3-25 cm, and more specifically 6-15 cm, from the combustion engine 6, in particular from the engine block 27 of the combustion engine 6.

The pipe 21 may be routed in vicinity of the combustion engine in various ways, depending on the design and type of combustion engine and the desired heat transfer capacity of the battery heating circuit 20. In one example embodiment, the pipe 21 is routed along at least three sides of the combustion engine 6, as seen from above. For example, with reference to FIG. 2, the pipe 21 may be routed along at the right side 28, the front side 29 and the left side 30 of the combustion engine 6. However, if for example the exhaust manifold of the combustion engine is facing rearwards of the vehicle 1, it may suitable to route the pipe 21 along the rear side 31 of the combustion engine instead, or in combination with one or more other sides 28-30.

Figure 2:
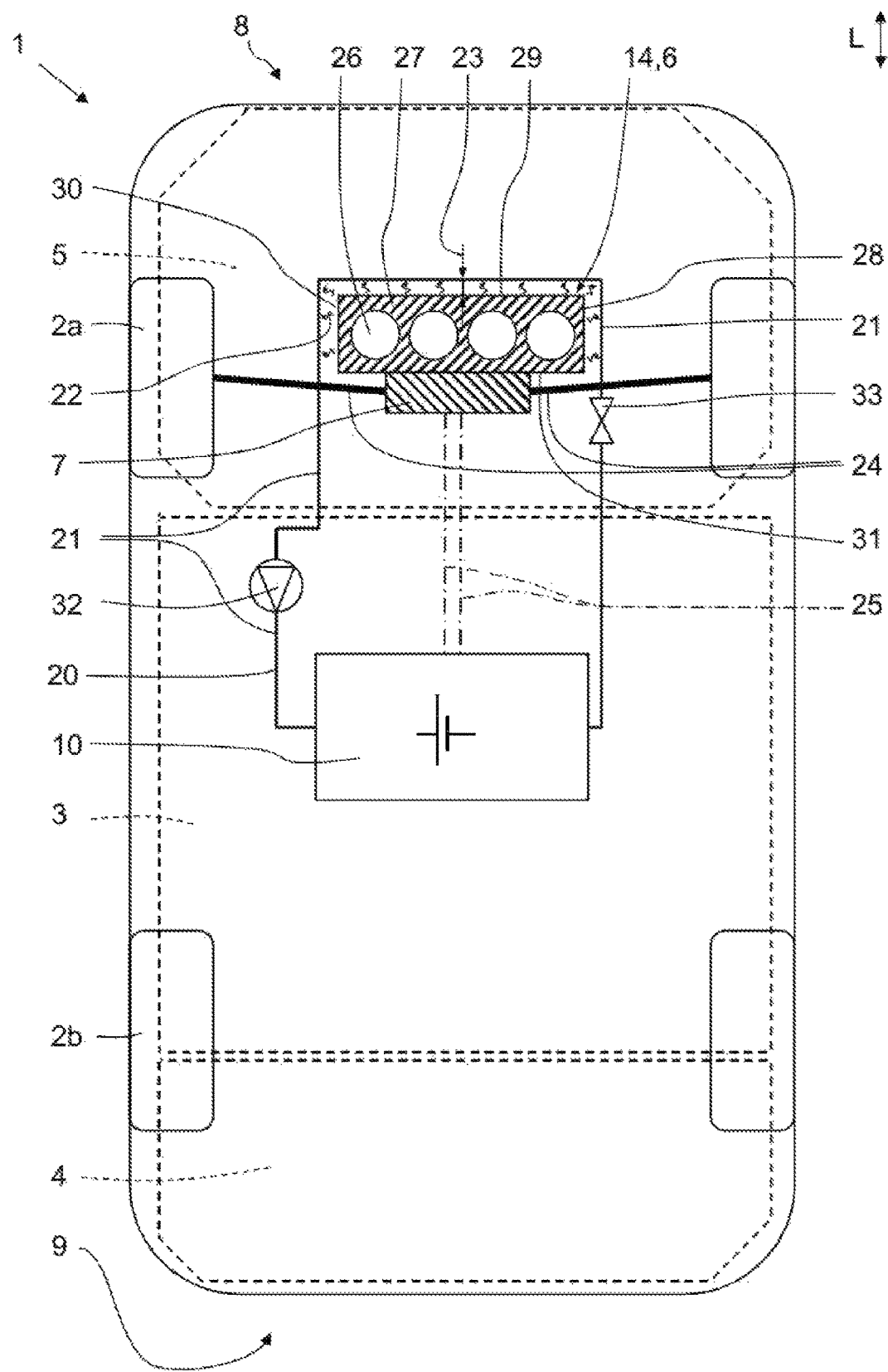
FIG. 2 shows a schematic top-view of an example embodiment of the layout of the battery thermal management system of the disclosure including a combustion engine.

Moreover, the pipe 21 may be routed to simply extend once along one or more of the side surfaces 28-31 of the combustion engine 6, as schematically illustrated in FIG. 2. Alternatively, the pipe 21 may be routed two extend twice, or three or even more times along one or more of the side surfaces 28-31 of the combustion engine. For example, the pipe 21 may be routed two, three or even more laps around the combustion engine 6 The pipe may alternatively, or in combination with above, have a meander-shaped routing along one or more side surfaces 28-31 of the combustion engine 6, and/or some other waste-heat source 14, such as the exhaust manifold, catalytic converter, turbo charger, or the like.

In general, a waste-heat source of the vehicle drivetrain according to the present disclosure typically refers to an object of the drivetrain having an outer surface temperature of at least 50 deg C., specifically at least 75 deg C., at normal operating conditions, i.e. after temperature of the various parts of the drivetrain have stabilized.

The pipe 21 may for example be made of aluminium. This enables use of a lightweight and easily produced and formed material for the pipe 21.

The pipe 21 may for example be a seamless extruded aluminium pipe, or a seamless or welded steel pipe. A seamless extruded aluminium pipe is for example manufactured by extruding a billet through a die using a centrally arranged mandrel. A seamless steel pipe is for example manufactured by heating and forming a solid cylindrical billet and subsequently rolling and piercing the heated billet to form a stretched and hollowed seamless pipe. Finally, a welded steel pipe is for example manufactured by rolling flat elongated steel bar through a series of rollers that stepwise mold the material into a circular tube-like shape with two lengthwise extending ends, and subsequently welding the two ends of the pipe together to form a closed and sealed steel pipe.

The pipe 21 may have a circular cross-section and a smooth rounded outer surface, such that practically any type of conventional and low-cost pipe can be used, thereby ensuring very low material cost.

Alternatively, the pipe 21 may have a shape specifically designed for improved engine heat-radiation and/or engine heat-convection adsorbing performance. For example, the pipe 21 may have a rectangular or elliptical cross-section for increasing the heat-adsorbing surface area of the pipe 21. Still more alternatively, the pipe 21 may be integral or attached fins or similar protrusions extending radially outwardly on the outer surface of the pipe 21 for increasing the heat transfer rate from the combustion engine 6 to the battery coolant.

If the pipe has a circular cross-section, the pipe 21 may have an interior diameter of 5-50 mm, specifically 7-35 mm, and more specifically 10-20 mm.

Moreover, the pipe 21 may be routed to have a length of 0.5-4 meters, specifically 0.75-3 meters, and more specifically 1-2 meters with the engine bay.

The specific design, form, material, routing and length of the pipe 21 may be selected taking into account the routing of the pipe 21 along the combustion engine 6, e.g. the distance between the pipe 21 and the engine, the temperature of the engine at the location of the pipe routing, the length of the pipe routing along the engine, the desired heat transfer rate in Watts for a certain operating condition, etc.

The thermal management system may further comprise a battery coolant circulation pump 32 located in the battery heating circuit 20, e.g. in the flow path of the pipe 21, for controlling the flow of battery coolant in the battery heating circuit 20. Upon operation of the battery coolant circulation pump 32, which may for example be electrically, hydraulically or pneumatically powered, or the like, battery coolant will flow through the battery heating circuit 20. The battery 10 may for example have internal flow paths configured for routing battery coolant through the battery, specifically along the battery cells of the battery. A battery coolant expansion chamber (not showed) may also be provided for compensating volume increase in battery coolant upon increased temperature level.

The thermal management system may further comprise a valve 33 located in the battery heating circuit 20, e.g. the flow path of the pipe 21 for controlling the flow of battery coolant in the battery heating circuit 20. For example, the valve 33 may be held open during combustion engine cold start for enabling flow of battery coolant in the battery heating circuit 20, and the valve 33 may be closed when the HV battery 10 has reached a target operating temperature, and thus likely does not need further heating. However, should the temperature of the battery 10 drop below a threshold value the valve 33 may be opened again.

Moreover, the valve 33 of the battery heating circuit is advantageously a proportional valve 33, so that the flow opening through the valve 33 may be gradually adjusted between a fully closed and fully opened state. Alternatively, the valve 33 may be omitted and the flow control of the battery coolant in the battery heating circuit 20 may be controlled by the battery coolant circulation pump 32 only.

Figure 3:
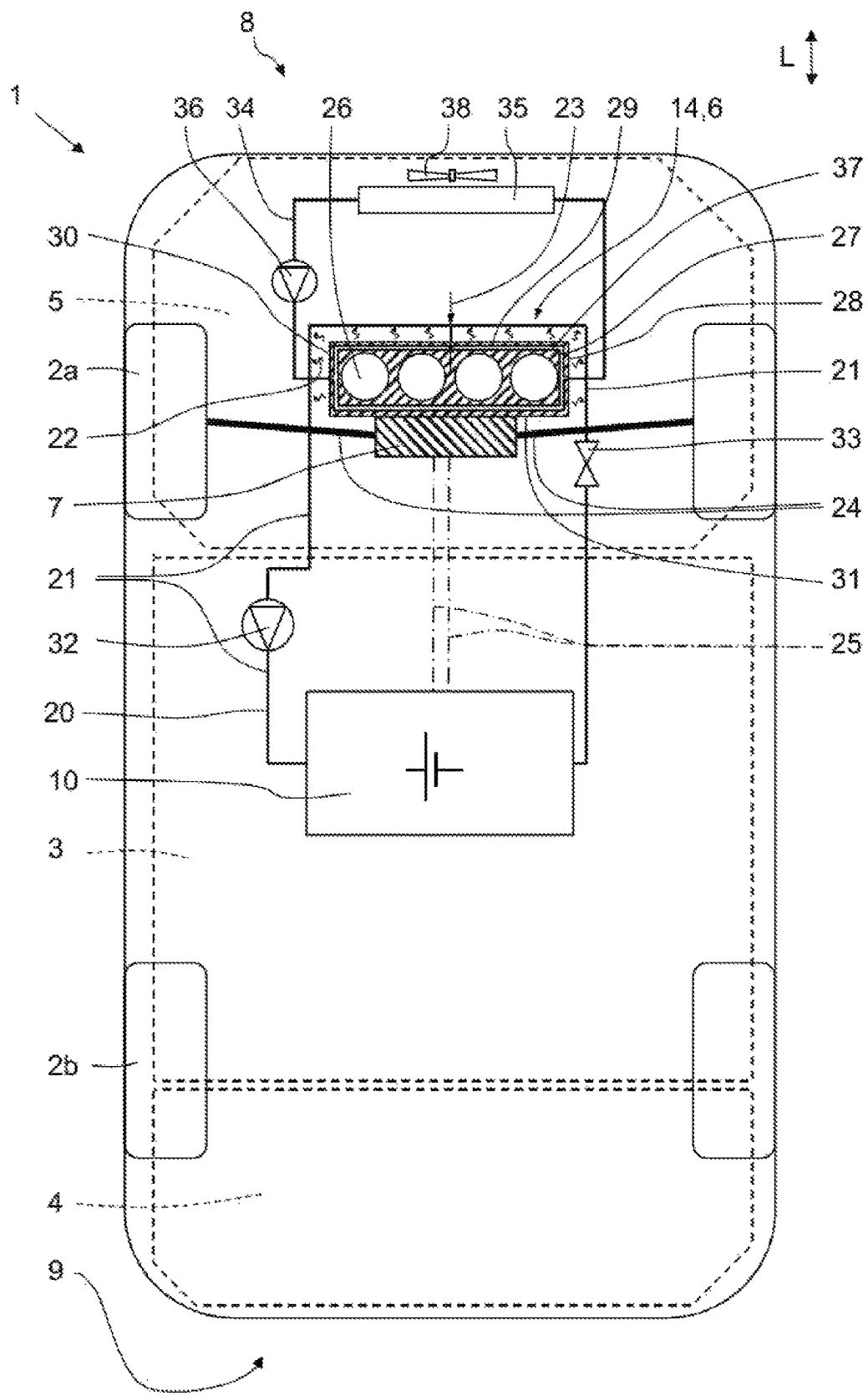
FIG. 3 shows a schematic top-view of another example embodiment of the layout of the battery thermal management system of the disclosure including a liquid-cooled combustion engine.

The combustion engine 6 may for example be air-cooled or liquid-cooled. An example embodiment of the thermal management system according to the disclosure including a liquid-cooled combustion engine is schematically illustrated in FIG. 3.

The engine cooling circuit 34 may include a radiator 35 and an engine coolant circulation pump 36 and being arranged for cooling the combustion engine 6 by circulating an engine coolant through the engine cooling circuit 34.

Specifically, the engine coolant circulating pump 36 generates a circulating flow of engine coolant within the engine cooling circuit 34, such that heat from the combustion process is transferred from the combustion engine 6 to the engine coolant when the engine coolant passes through the combustion engine 6, for example via coolant channels 37 within the engine block 27. The heated engine coolant is subsequently cooled when passing through the radiator 35, in which heat from the engine coolant is transferred to the surrounding air.

A fan 38 may be provided for blowing air through the radiator 35 for accomplishing forced heat transfer in the radiator 35.

There is however no arrangement for providing heat transfer from the engine coolant to the battery coolant, because such an arrangement would delay warming up of the combustion engine during cold start of the combustion engine 6, and thereby have negative effects on combustion efficiency, fuel consumption and cleaning of exhaust gas emission in exhaust gas treatment devices, such as a catalyst converter or a particle filter.

In other words, when the combustion engine 6 is a liquid-cooled engine having engine cooling circuit 34 including a radiator 35 and an engine coolant circulation pump 36, the battery thermal management system is free from a heat-exchanger connected to engine cooling circuit 34 and to the battery heating circuit 20 and configured for transferring heat from the engine coolant to battery coolant.

The engine coolant is also not routed through or in the vicinity of the HV battery 10 for providing a heat transfer from the engine coolant to the HV battery 10 for the same reasons.

Instead, warming up of the HV battery 10 is performed by capturing and using heat loss from the combustion engine, i.e. heat that otherwise simply would be heating up parts or the chassis in the engine bay, or ventilated out from the vehicle, wherein the heat absorption of the battery coolant does not have negative effect on engine heating up.

Figure 4:
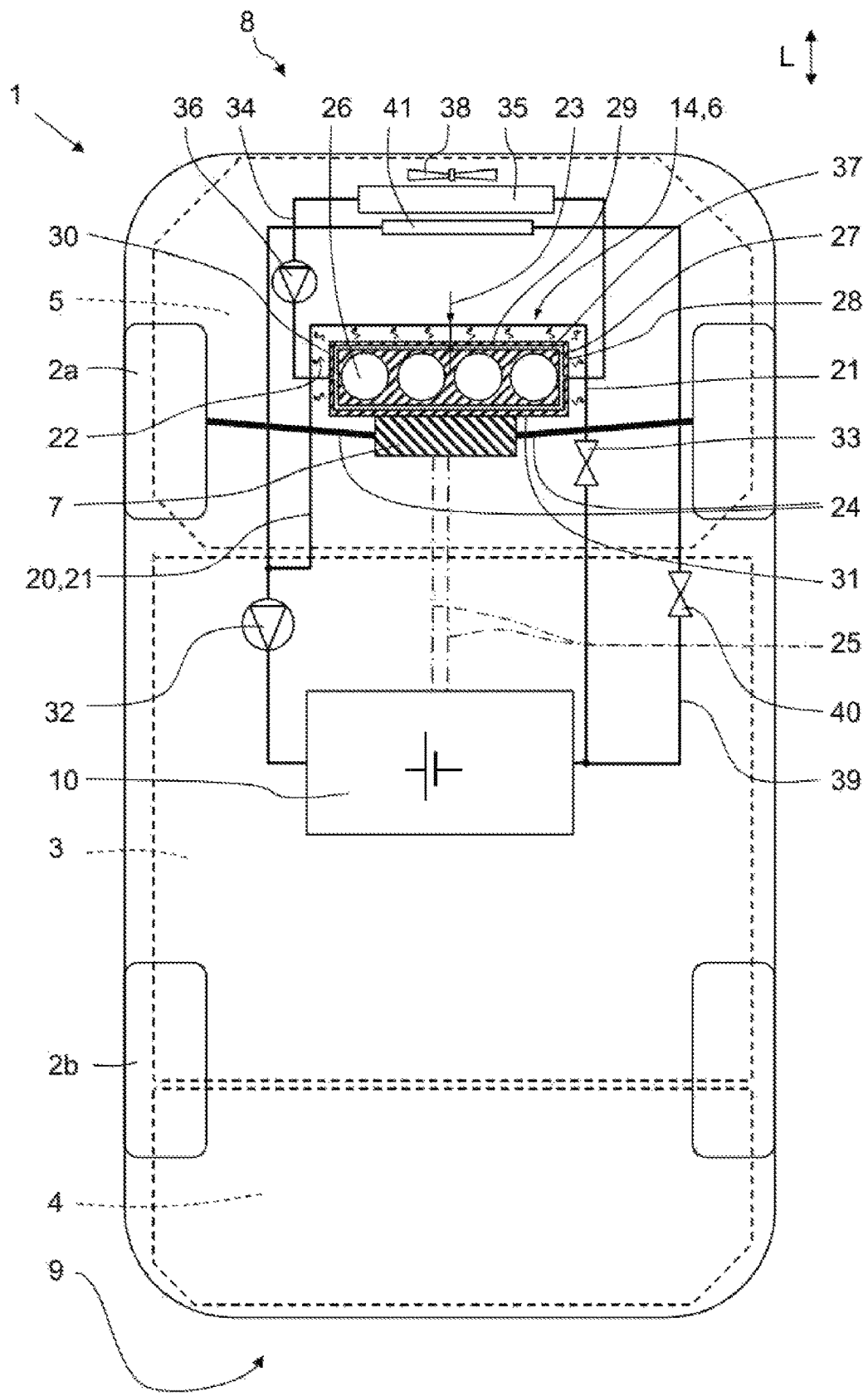
FIG. 4 shows a schematic top-view of still another example embodiment of the layout of the battery thermal management system of the disclosure including both battery warming and heating.

As schematically illustrated in FIG. 4, the battery thermal management system may according to a further example embodiment additionally comprise a battery cooling circuit 39 configured for circulating the battery coolant, wherein the battery cooling circuit 39 and battery heating circuit 20 have a common battery coolant circulation pump 32.

Having a common battery coolant circulation pump is deemed advantageous because it results I overall less components. However, the battery cooling circuit 39 may alternatively be provided with a separate and individual battery coolant circulation pump, if the specific implementation makes this advantageous.

The battery coolant circuit 39 comprises a valve 40 for controlling the flow of battery coolant in the battery cooling circuit 39, and a passive cooler in form of a radiator 41 for passive cooling of the battery coolant. Passive cooling herein refer to cooling via ambient air, i.e. by having hot battery coolant become cooled when passing through the radiator 41, in which heat from the battery coolant is transferred to the surrounding air.

By controlling operation of the valve 40 in the battery cooling circuit 39 and operation of the valve 33 in the battery heating circuit 20, it is possible to accomplish either heating or cooling of the battery coolant, at least when the ambient temperature is lower than the battery coolant temperature.

Moreover, if the combustion engine 6 has reached its target operating temperature and the battery still needs heating to reach its target operating temperature, but the battery coolant in the pipe is too warm to enter the battery 10 due to potential heat damages to the battery 10, the valve 33 of the battery cooling circuit 20 and the valve 40 of the battery heating circuit 39 may both be controlled to be partly opened, such that heated battery coolant returning from the combustion engine 6 routing may be mixed with cold battery coolant from the radiator 41, such that a target battery coolant temperature may be accomplished.

According to a further example embodiment of the battery thermal management system described with reference to FIG. 5, the battery thermal management system comprises a multi-way selector valve 42 for enabling the battery coolant to flow in either the battery cooling circuit 39 or the battery heating circuit 20, or partly in the battery cooling circuit 39 and partly in the battery heating circuit 20, or to stop flow of battery coolant through the multi-selector vale 42.

Figure 5:
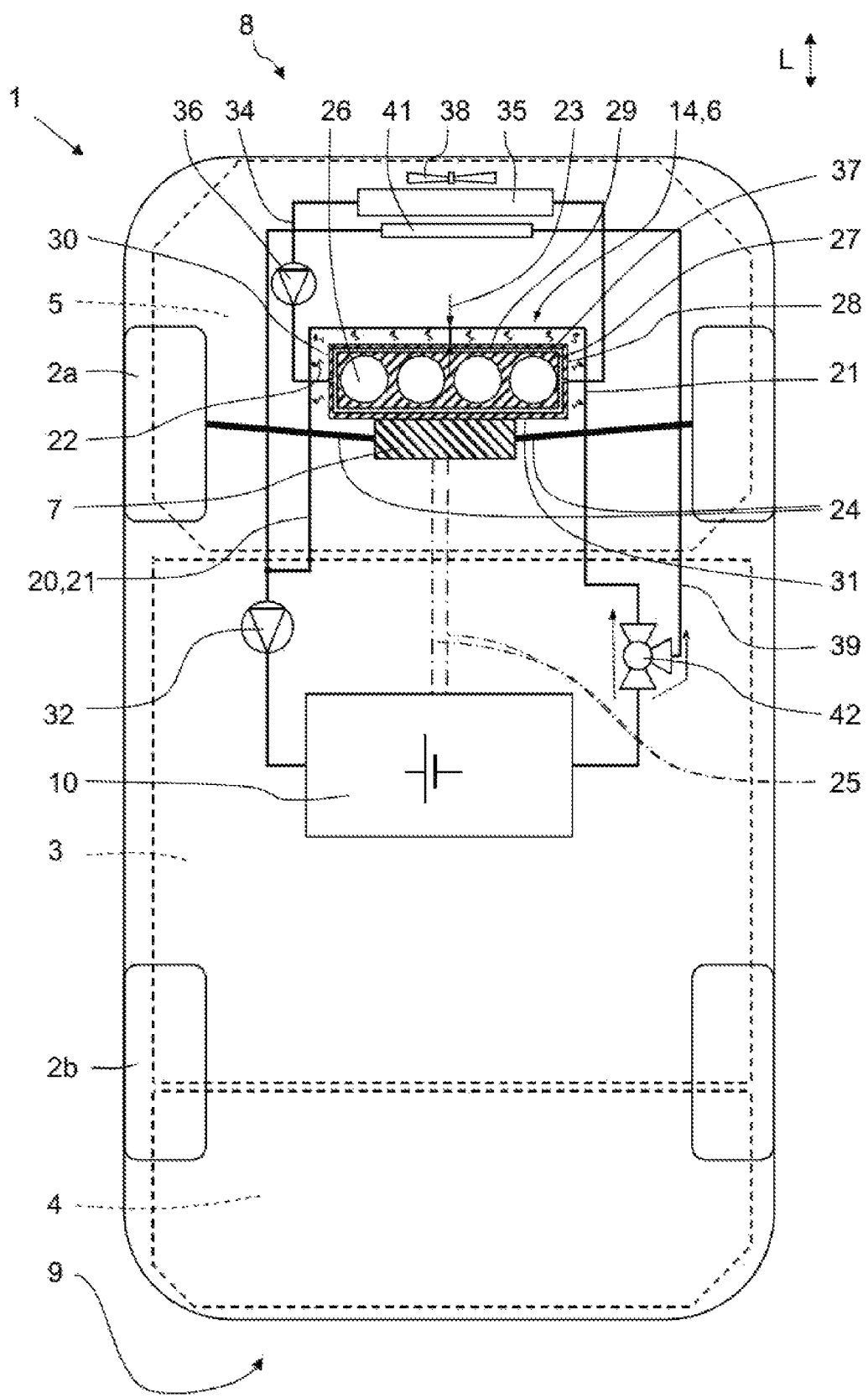
FIG. 5 shows a schematic top-view of a further example embodiment similar to that of FIG. 4, but with a multi-way selector valve.

Hence, the battery thermal management system of the example embodiment disclosed in FIG. 5 is identical with the battery thermal management system of the example embodiment disclosed in FIG. 4, except that the valve 40 in the battery cooling circuit 39 and the valve 33 in the battery heating circuit 20 are replaced with the multi-way selector valve 42.

According to a further example embodiment of the battery thermal management system described with reference to FIG. 6, the battery thermal management system additionally comprises an active cooler in form of a heat-exchanger 43 forming part of an active cooling circuit 44 including a compressor 45 and a condenser 46, wherein the multi-way selector valve 42 is configured for enabling the battery coolant to selectively flow in the battery heating circuit 20, or through the passive cooler in form of a radiator 41 of the battery cooling circuit 39, or through the heat-exchanger 43 of the active cooling circuit 44.

In other words, the multi-way selector valve 42 may be set to route the battery coolant through an additional battery cooling circuit 48 including the heat-exchanger of the active cooling circuit 44.

This embodiment of the battery thermal management system is advantageous in that is can provide cooling of the HV battery also at warm ambient temperature, i.e. when the radiator 41 of the battery cooling circuit 39 does not provide any or only little cooling effect on the battery coolant, while still enabling energy-efficient cooling of the battery coolant during times of less-warm ambient temperature via passive cooling by means of the battery cooling circuit 39.

Figure 6:
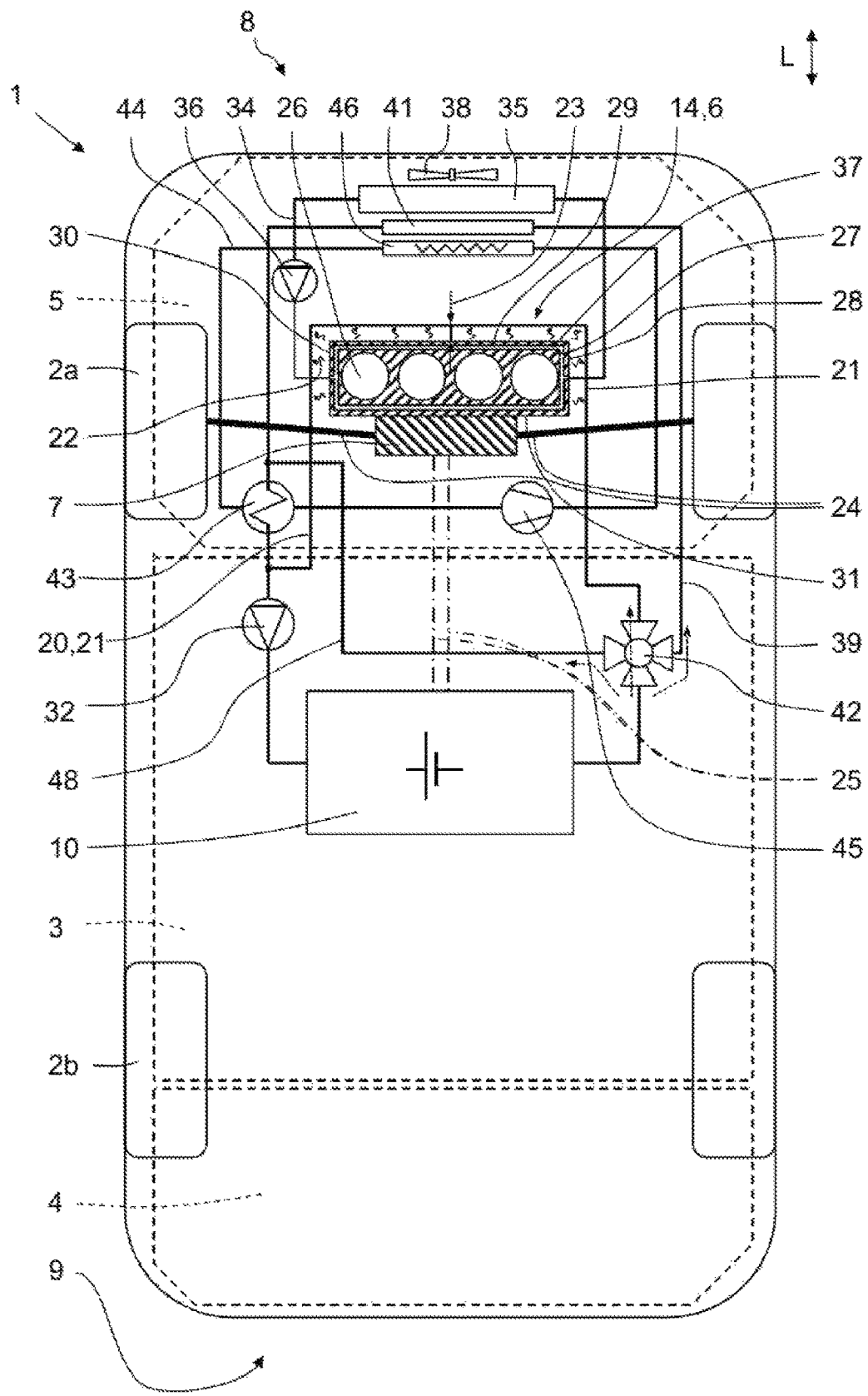
FIG. 6 shows a schematic top-view of still a further example embodiment of the layout of the battery thermal management system of the disclosure including battery heating and both active and passive battery cooling.

In the example embodiment of FIG. 6, battery coolant routed through the battery cooling circuit 39 passes also the heat-exchanger 43 of the active cooling circuit 44. This may be advantageous if the cooling effect of the radiator 41 is not sufficient, and a certain extra cooling effect is required. Then this extra cooling effect may be provided by the heat-exchanger 43. Alternatively, if the battery coolant routed through the battery cooling circuit 39 does not pass through also the heat-exchanger 43 of the active cooling circuit 44, the required additional cooling effect may be provided by using the multi-way selector valve to route is a certain flow through the battery cooling circuit 39 and a remaining flow through the additional battery cooling circuit 48.

Figure 7:
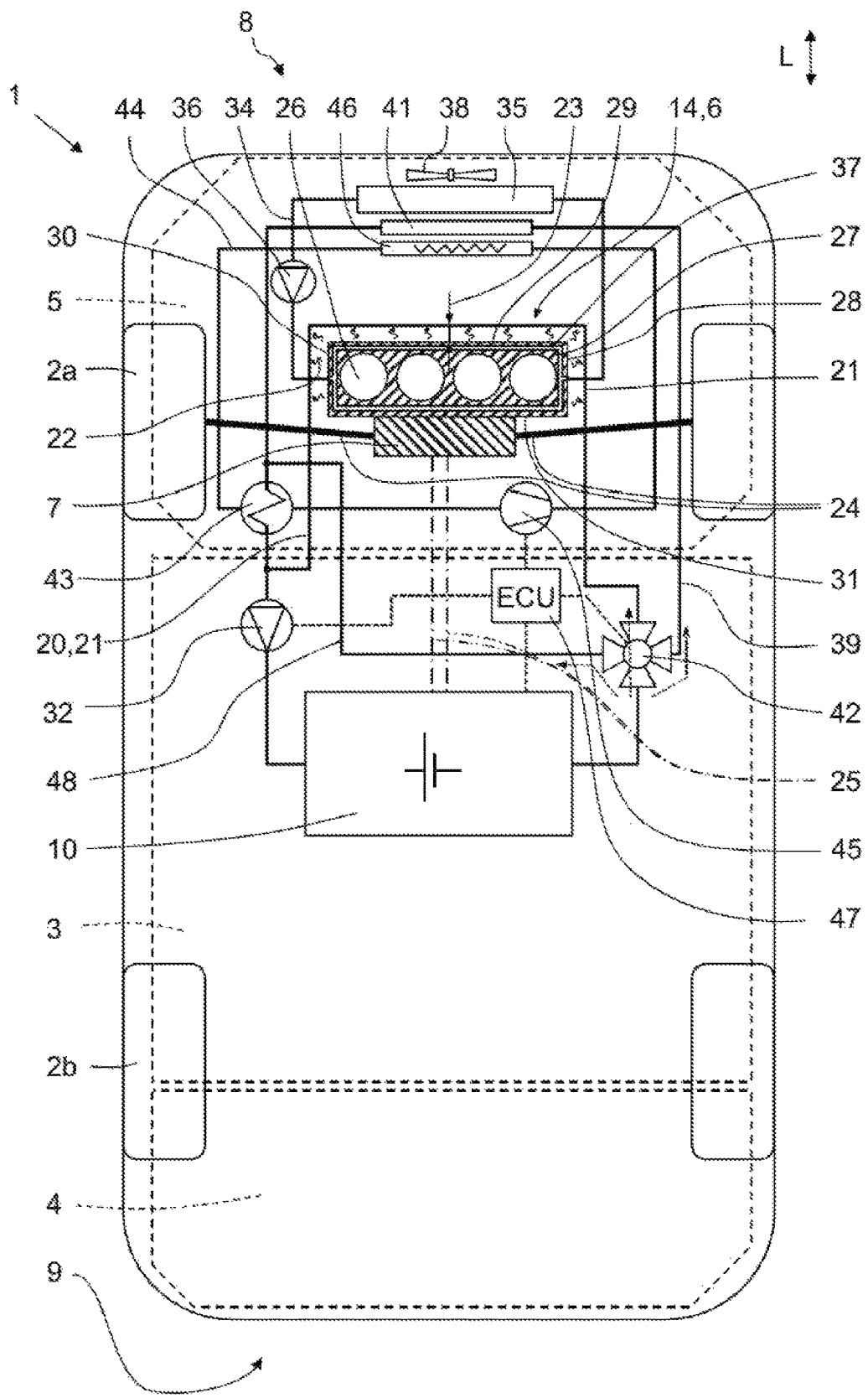
FIG. 7 shows a schematic top-view of still another example embodiment of the layout of the battery thermal management system similar to that of FIG. 6, but also showing an ECU.

Furthermore, in one example embodiment schematically illustrated in FIG. 7, the battery thermal management system additionally comprises an electronic control unit 47 configured for controlling the operation of at least the battery coolant circulating pump 32 and the multi-way selector valve 42, wherein the electronic control unit 47 configured for circulating the battery coolant in the battery heating circuit 20 when an operating temperature of the HV battery 10 is below a first threshold value, and wherein the electronic control unit 47 configured for circulating the battery coolant in the battery cooling circuit 39, and/or in the additional cooling circuit 48, when the operating temperature of the HV battery 10 is above a second threshold value.

Figure 8:
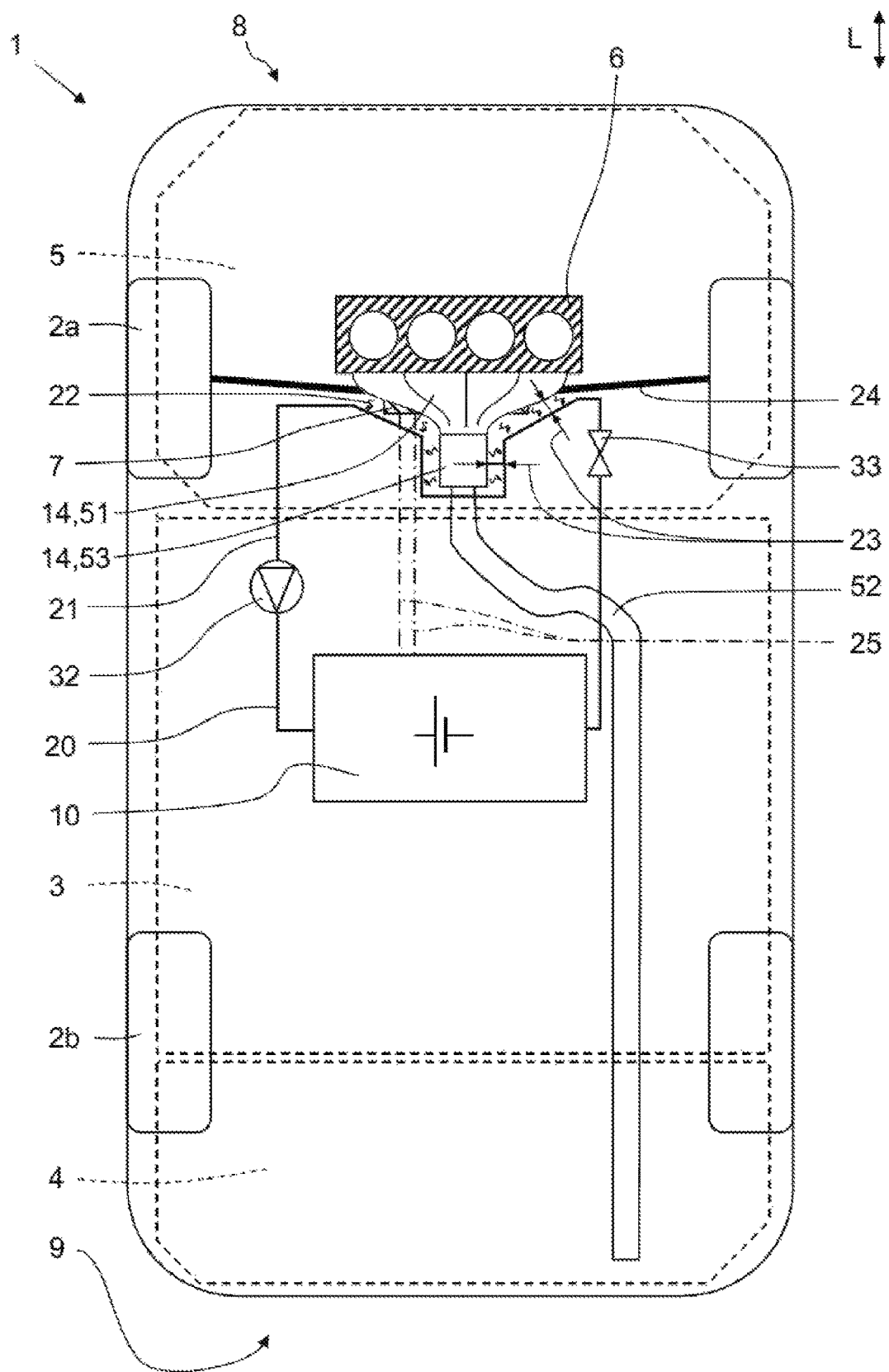
FIG. 8 shows a schematic top-view of a further example embodiment of the layout of the battery thermal management system of the disclosure including exhaust manifold and catalyst converter.

The battery thermal management system has been described above primarily in the context of a combustion engine 6 as the waste-heat source 14. However, a driveline comprising a combustion engine 6 generally has many further waste-heat sources 14 apart from the engine block of the combustion engine. For example, as shown in FIG. 8, the waste-heat source 14 may be an exhaust manifold 51, an exhaust system 52, the catalyst converter 53, or a turbo charger (not showed), which are all significant waste-heat sources.

The pipe 21 of the battery heating circuit 20 may in such case be routed in the vicinity of one or more of said exhaust manifold 51, exhaust system 52, catalyst converter 53, or turbo charger. For example, as illustrated in FIG. 8, the pipe 21 may be routed at a distance 23 in the range of 1-50 cm, specifically 3-25 cm, and more specifically 6-15 cm, from the said exhaust manifold 51 and said catalyst converter 53.

Figure 9:
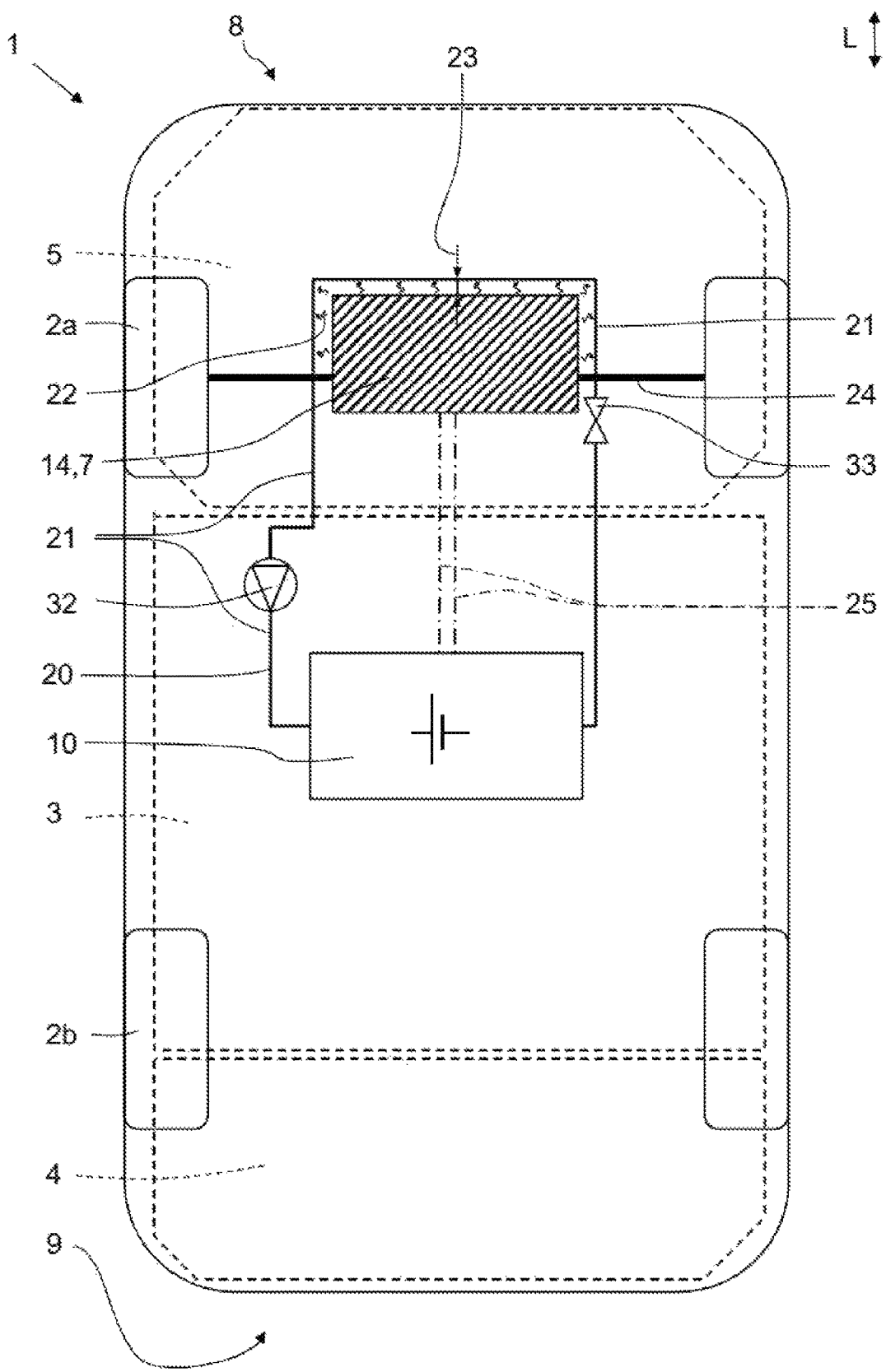
FIG. 9 shows a schematic top-view of a further example embodiment of the layout of the battery thermal management system of the disclosure implemented in a pure electrical vehicle.

According to a further example embodiment, the waste-heat source 14 may be the electrical propulsion motor 7, as schematically illustrated in FIG. 9. Depending on generated propulsion torque, the electrical propulsion motor 7 may generate a significant amount of waste-heat that is otherwise lost to the surroundings. However, by routing the pipe 21 of the battery heating circuit 20 in the vicinity of the electrical propulsion motor 7, battery coolant within the pipe 21 may be heated by heat-radiation emitted from the electrical propulsion motor 7 and/or heat-convection through air from the electrical propulsion motor 7 to the battery coolant, thereby enabling heating of the battery 10 by the battery coolant.

The pipe 21 may for example be routed at a distance 23 in the range of 1-50 cm, specifically 3-25 cm, and more specifically 6-15 cm, from the electrical propulsion motor 7.

Figure 10:
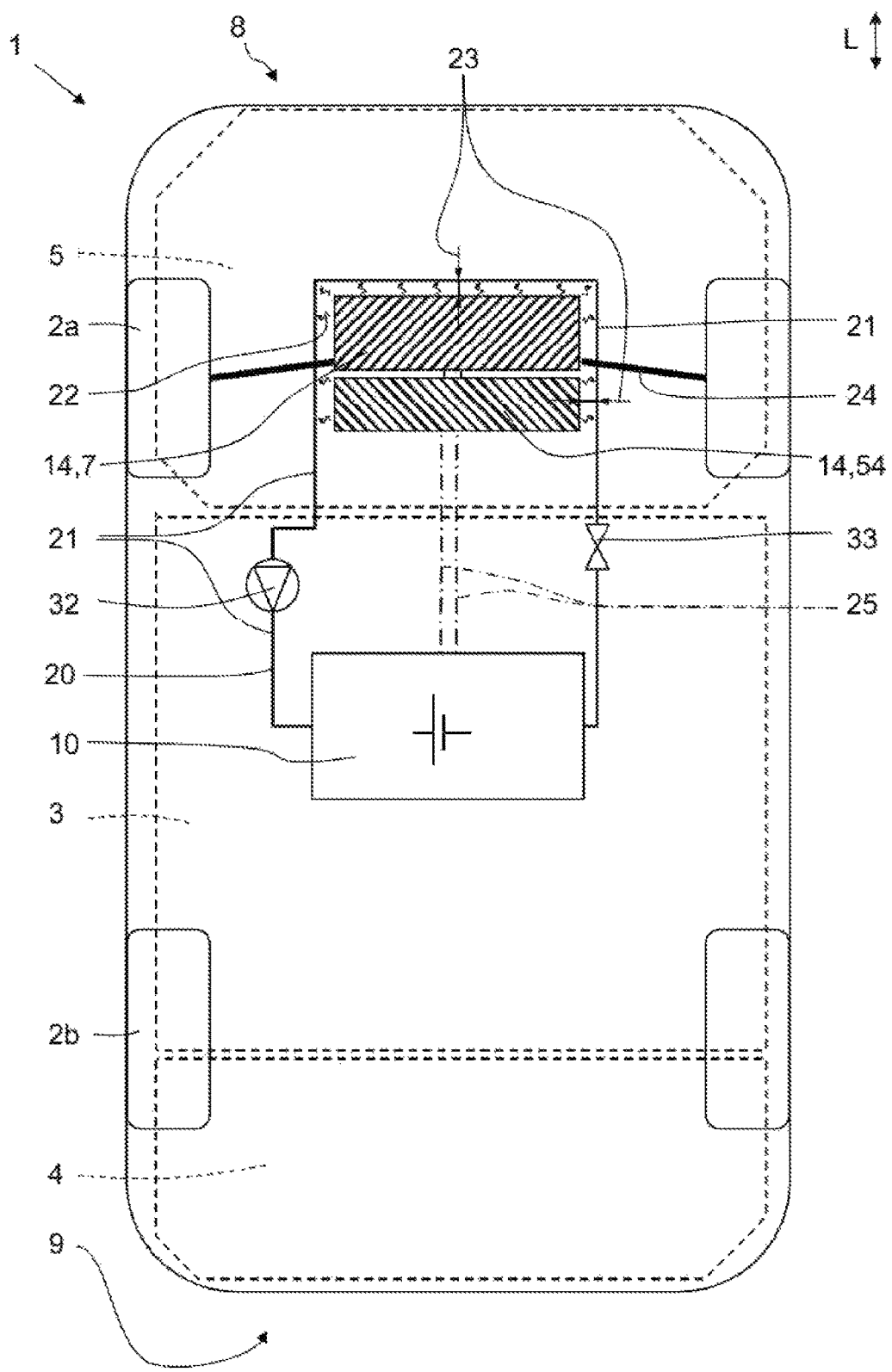
FIG. 10 shows a schematic top-view of still a further example embodiment of the layout of the battery thermal management system of the disclosure implemented in a fuel cell powered vehicle.

Still more alternatively, the waste-heat source 14 may be a fuel cell 54, as schematically illustrated in FIG. 10. The fuel cell 54 converts chemical energy from a fuel into electrical energy for charging the HV battery 10 and for powering the electrical propulsion motor 7.

By routing the pipe 21 of the battery heating circuit 20 in the vicinity of the fuel cell 54, battery coolant within the pipe 21 may be heated by heat-radiation emitted from the fuel cell 54 and/or heat-convection through air from the fuel cell 54 to the battery coolant, thereby enabling heating of the battery 10 by the battery coolant.

The pipe 21 may for example be routed at a distance 23 in the range of 1-50 cm, specifically 3-25 cm, and more specifically 6-15 cm, from the fuel cell 54.

Furthermore, other aspects and features described above with reference to FIGS. 2-7, where the combustion engine 6 represented the waste-heat source 14, may be equally implemented in any of the embodiments described with reference to FIGS. 8-10, wherein the exhaust manifold 51, exhaust system 52, catalyst converter 53, turbo charger, electrical propulsion motor 7 or the fuel cell 54 represented the waste-heat source 14.

Electrical power converters (not showed) are generally provided between the HV battery 10 and the fuel cell 54 in FIG. 10, and between the fuel cell and the electrical propulsion motor 7.

The disclosure also relates to a method for heating a high-voltage propulsion battery 10 of a vehicle 1 comprising a drivetrain with a waste-heat source 14. The method is described with reference to FIG. 8 and comprises at least steps of:

providing S1 a battery heating circuit 20 including a pipe 21 that is routed in the vicinity of, and spaced-apart from, the waste-heat source 14;

conveying S2 a battery coolant through the pipe 21 for heating up the battery coolant within the pipe 21 by heat-radiation emitted from the waste-heat source 14 and/or heat-convection through air from the waste-heat source 14 to the battery coolant; and conveying S3 the heated battery coolant by the battery heating circuit 20 to the battery 10 for enabling heating of the battery 10 by the battery coolant.

Although the disclosure has been described in relation to specific combinations of components, it should be readily appreciated that the components may be combined in other configurations as well which is clear for the skilled person when studying the present application. Thus, the above description of the example embodiments of the present disclosure and the accompanying drawings are to be regarded as a non-limiting example of the disclosure and the scope of protection is defined by the appended claims.

Placement of various components of the battery thermal management system, such a HV battery 10, battery coolant circulating pump 32, multi-way selector valve 43, heat-exchanger 43 and compressor 45 in various places of the vehicle, such as passenger compartment 3, luggage compartment 4 or engine bay 5, is purely schematic and should not be deemed restrictive. Instead, the various components of the battery thermal management system may alternatively be positioned in another part of the vehicle than showed in FIG. 7.

Any reference sign in the claims should not be construed as limiting the scope.

The use of the word "a" or "an" in the specification may mean "one," but it is also consistent with the meaning of "one or more" or "at least one." The term "about" means, in general, the stated value plus or minus 10%, or more specifically plus or minus 5%. The use of the term "or" in the claims is used to mean "and/or" unless explicitly indicated to refer to alternatives only.

The terms "comprise", "comprises" "comprising", "have", "has", "having", "include", "includes", "including" are open-ended linking verbs. As a result, a method or device that "comprises", "has" or "includes" for example one or more steps or elements, possesses those one or more steps or elements, but is not limited to possessing only those one or more elements.

What is claimed is:

1. A battery thermal management system for a vehicle having a drivetrain, the thermal management system comprises a high-voltage propulsion battery,
   a waste-heat source of the vehicle drivetrain, and
   a battery heating circuit configured for circulating a battery coolant,
   wherein the battery heating circuit includes a pipe being routed in the vicinity of, and spaced-apart from, the waste-heat source and configured for conveying the battery coolant for enabling the battery coolant within the pipe to heat-up by heat-radiation emitted from the waste-heat source and/or heat-convection through air from the waste-heat source to the battery coolant, and
   the battery heating circuit is configured for conveying the heated battery coolant to the battery for enabling heating of the battery by the battery coolant.

2. The battery thermal management system according to claim 1, wherein the pipe is made of aluminium.

3. The battery thermal management system according to claim 1, wherein the pipe has a circular cross-section and a smooth rounded outer surface.

4. The battery thermal management system according to claim 1, wherein the pipe has a rectangular or elliptical cross-section and/or fins extending radially outwardly on an outer surface for increasing the heat transfer from the waste-heat source to the battery coolant.

5. The battery thermal management system according to claim 1, wherein the pipe is partly routed within in the range of 1-50 cm of the waste-heat source.

6. The battery thermal management system according to claim 1, wherein the pipe has an interior diameter of 5-50 mm.

7. The battery thermal management system according to claim 1, wherein the waste-heat-source is a combustion engine, or an exhaust manifold, or an exhaust system, or a catalyst converter, or a turbo charger, or an electrical propulsion motor, or a fuel cell.

8. The battery thermal management system according to claim 1, wherein the pipe is routed along at least three sides of the waste-heat source, as seen from above.

9. The battery thermal management system according to claim 1, wherein the waste-heat source is a liquid-cooled combustion engine having an engine cooling circuit including a radiator and a circulation pump, wherein the battery thermal management system is free from a heat-exchanger connected to the engine cooling circuit and to the battery heating circuit and configured for transferring heat from the engine coolant to the battery coolant.

10. The battery thermal management system according to claim 1, wherein the battery thermal management system further comprises a battery cooling circuit configured for circulating the battery coolant, wherein the battery cooling circuit and the battery heating circuit have a common battery coolant circulation pump.

11. The battery thermal management system according to claim 10, wherein the battery cooling circuit comprises a passive cooler in form of a radiator and an active cooler in form of a heat-exchanger forming part of an active cooling circuit including a compressor and a condenser, wherein a multi-way selector valve is configured for enabling the battery coolant to selectively flow in the battery heating circuit, or through the passive cooler of the battery cooling circuit, or through the heat-exchanger of the active cooling circuit.

12. The battery thermal management system according to claim 10, wherein the battery thermal management system further comprise an electronic control unit configured for controlling the operation of at least the battery coolant circulation pump and a selector valve, wherein the electronic control unit is configured for circulating the battery coolant in the battery heating circuit when an operating temperature of the battery is below a first threshold value, and wherein the electronic control unit is configured for circulating the battery coolant in the battery cooling circuit when the operating temperature of the battery is above a second threshold value.

13. A vehicle comprising an engine bay, a passenger compartment and luggage compartment, wherein the vehicle further comprises a battery thermal management system according to claim 1, wherein the waste-heat source is located in the engine bay in a front region of the vehicle and the battery is located beneath a passenger compartment floor or a luggage compartment floor.

14. The vehicle according to claim 13, wherein the pipe is routed to have a length of 0.5-4 meters within the engine bay.

* * * * *